United States Patent [19]
Tomida

[11] Patent Number: 5,914,788
[45] Date of Patent: Jun. 22, 1999

[54] FACSIMILE/PRINTER DEVICE HAVING A RECORDING PRIORITY SETTING OPTION

[75] Inventor: Wataru Tomida, Owariasahi, Japan

[73] Assignee: Brother Kogyo Kabushiki Kaisha, Nagoya, Japan

[21] Appl. No.: 08/613,117

[22] Filed: Mar. 8, 1996

[30] Foreign Application Priority Data

Mar. 10, 1995 [JP] Japan ..................................... 7-051142

[51] Int. Cl.$^6$ .................................................... H04N 1/00
[52] U.S. Cl. ........................................... 358/434; 358/404
[58] Field of Search ..................................... 358/434, 435, 358/436, 437, 438, 439, 440, 441, 404, 468; 379/100; 395/111–114

[56] References Cited

U.S. PATENT DOCUMENTS

| | | | |
|---|---|---|---|
| 4,708,470 | 11/1987 | Satonaka et al. ......................... | 355/77 |
| 4,829,559 | 5/1989 | Izawa et al. ............................... | 379/96 |
| 4,947,345 | 8/1990 | Paradise et al. .......................... | 364/519 |
| 4,970,549 | 11/1990 | Yoshizuka et al. ...................... | 355/209 |
| 5,200,830 | 4/1993 | Imaizumi et al. ....................... | 358/296 |
| 5,299,296 | 3/1994 | Padalino et al. ........................ | 395/112 |
| 5,377,016 | 12/1994 | Kashiwagi et al. ..................... | 358/403 |
| 5,428,457 | 6/1995 | Okumura et al. ....................... | 358/403 |
| 5,627,658 | 5/1997 | Connors et al. ......................... | 395/114 |

*Primary Examiner*—Edward L. Coles, Sr.
*Assistant Examiner*—Stephen Brinich
*Attorney, Agent, or Firm*—Oliff & Berridge, P.L.C.

[57] ABSTRACT

In a device having both a facsimile function and a printing function, a priority can be given, for example, to a printer section to perform printing of print data in a common recording section precedent to fax data. In this case, recording of fax data applied to a recording section is rejected despite the fact that the fax data is applied to the recording section earlier than the print data. The fact that the priority has been set is indicated in a relevant portion of a display.

24 Claims, 11 Drawing Sheets

FACSIMILE/PRINTER DEVICE HAVING A RECORDING PRIORITY SETTING OPTION

BACKGROUND OF THE INVENTION

1. Field of the Invention

The present invention relates to a facsimile/printer device having facsimile and printer sections and selectively operable as a facsimile and a printer. More particularly, the invention relates to such a facsimile/printer device capable of giving an operation priority to either one of facsimile and printer sections.

2. Description of the Related Art

General facsimile devices are provided with a facsimile function portion which carries out driving control of an image forming device according to facsimile data (hereinafter referred to as "fax data") transmitted via a telephone line or the like. A facsimile device with printer function uses its image forming device to print code data (hereinafter referred to as "PC data") outputted from a personal computer or other device. In short, the facsimile device with printer function is constructed by providing a printer function portion to a general facsimile device. The printer function portion controls drive the image forming device according to PC data inputted via a printer cable or the like.

Such facsimile devices with printer function either form images based on fax data first or print PC data first depending on whichever is inputted earlier to the image forming device. That is, when fax data is inputted to the image forming device before PC data, then the fax data is printed before PC data, and vice versa. Therefore, the PC data will not be printed immediately if fax data is received before the PC data.

To allow PC data to be printed before fax data is reproduced or vice versa, the device may be configured to have an option such that an operation priority is given to either one of the printer function or facsimile function. However, even if the device were so configured, various inconveniences may occur if the operator does not recognize to which function the operation priority is given. The operator may set the operation priority to the printer function again despite the option already having been set to the printer function. The same is true when the operation priority has been set to the facsimile function. The operator may use the device under the mistaken impression that the operation priority has been set to either one of the functions or that no operation priority has been set. Such confusion about the operation priority will lower working efficiency.

SUMMARY OF THE INVENTION

In view of the foregoing, it is an object of the present invention to provide a facsimile device with printer function in which an option is provided for allowing an operator to set an operation priority to a selected one of a facsimile function and a printer function, and in which an indication as to set contents of, or non-setting of the operation priority is provided so that the operator can easily recognize the operation status of the facsimile device with printer function.

To achieve the above and other objects, there is provided a device having both a facsimile function and a printer function, in which a recorded section is commonly used by a facsimile section and a printer section. The facsimile section receives fax data from a remote facsimile device and applies the fax data to the input of the recording section to record the fax data. An external device, such as a personal computer is connectable to the printer section, and print data received from the external device is applied to the input of the recording section to record the print data on the recording sheet. In the present invention, priority mode setting means is provided for setting a priority mode in which a recording priority is set to either one of the facsimile section and the printer section. Display means is provided for displaying a priority set indication for indicating the priority mode when the recording priority has been set by the priority mode setting means. A control means selectively controls the recording section either in the priority mode or in a normal mode in which the priority mode is not set. In the priority mode, the control means controls the recording section so as to reject recording of the fax data or the print data from a section to which no recording priority is set. In the normal mode, the control means controls the recording section to either record the print data first or record the fax data first depending on which is applied earlier to the recording section.

The display means has a display region separated into a first display region and a second display region, and further displays, in the first display region, first information about the facsimile section and, in the second display region, second information about the printer section. Also, the priority set indication is displayed in a one of the first display region and the second display region corresponding to which section the recording priority mode is set. The priority set indication is represented by at least one of a letter and a symbol. Each of the first information and the second information is made up of a plurality of messages pertaining to operations and statuses of the facsimile section and the printer section. The control means controls the display means to display selected messages in the first display region and the second display region of the display means.

A sensing means is provided for sensing various operations and statuses of the facsimile section and the printer section, and outputs signals pertaining to sensed operations and statuses of the facsimile section and the printer section to the control means. In response thereto, the control means controls the display means to display relevant messages selected based on the signals outputted from the sensing means.

Preferably, the priority mode setting means includes time duration setting means for setting a time duration during which the priority mode set by the priority mode setting means is effective. In this case, the control means controls the recording section in the normal mode when the time duration set by the time duration setting means has expired.

Priority mode canceling means may be provided for canceling the priority mode set by the priority mode setting means. In this case, the control means controls the recording section to perform recording in the normal mode when the priority mode is canceled by the priority mode canceling means.

In accordance with another aspect of the present invention, there is provided a device having both a facsimile function and a printer function of the type described above, in which selection means is provided for selecting one of the fax data and the print data. The selected data is enabled upon operator's manipulation. The selected data is recorded by the recording section precedent to non-selected data. The selection means may comprise switching means manually operable by an operator for performing switching between a selection mode for selecting one of the fax data and the print data and a non-selection mode for disabling the selection mode. In this case, it is preferable to provide display means for displaying that the selection mode has been set by the operator. Alternatively, the selection means may comprise priority setting means for automatically setting a priority to a predetermined one of the fax data and the print data. Either the fax data or the print data to which the priority is set is recorded by the recording section precedent to no priority set data. To cancel the priority set by the priority setting means, canceling means may further be provided. The canceling means include time duration measuring means for measuring a predetermined time duration. The priority set by the priority setting means is canceled when the predetermined time duration has expired. To notify the operator that the priority has been set, it is preferable to provide display means. It is further preferable that the display means has a display region separated into a first display region and a second display region. In the first display region, first information about the facsimile section is displayed, and in the second display region, second information about the printer section is displayed. An indication of the priority set by the priority setting means is also displayed in a one of the first display region and the second display region in relation to the priority setting.

In accordance with a further aspect of the invention, there is provided a device having both a facsimile function and a printer function of the type described above, in which operation setting means is provided for setting a predetermined operation to be performed by selective one of the recording section, the facsimile section and the printer section. The operation setting means automatically sets a printer priority mode in which a recording priority is set to the printer section. Display means is also provided for displaying the printer priority mode. Control means is further provided for controlling the recording section to perform recording in accordance with the operation set by the operation setting means.

In accordance with a still further aspect of the invention, there is provided a device having both a facsimile function and a printer function of the type described above, in which priority setting means, display means and control means are provided. The priority setting means sets a recording priority to the facsimile section. The display means displays an indication that the recording priority is set to the facsimile section. The control means controls the recording section to perform recording of the fax data precedent to the print data.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

A preferred embodiment of the present invention will be described while referring to the accompanying drawings. Throughout the following description, the expression "front", "rear", "top" and "below" are used to define the various parts when a facsimile device is disposed in an orientation in which it is intended to be used.

Figure 2:
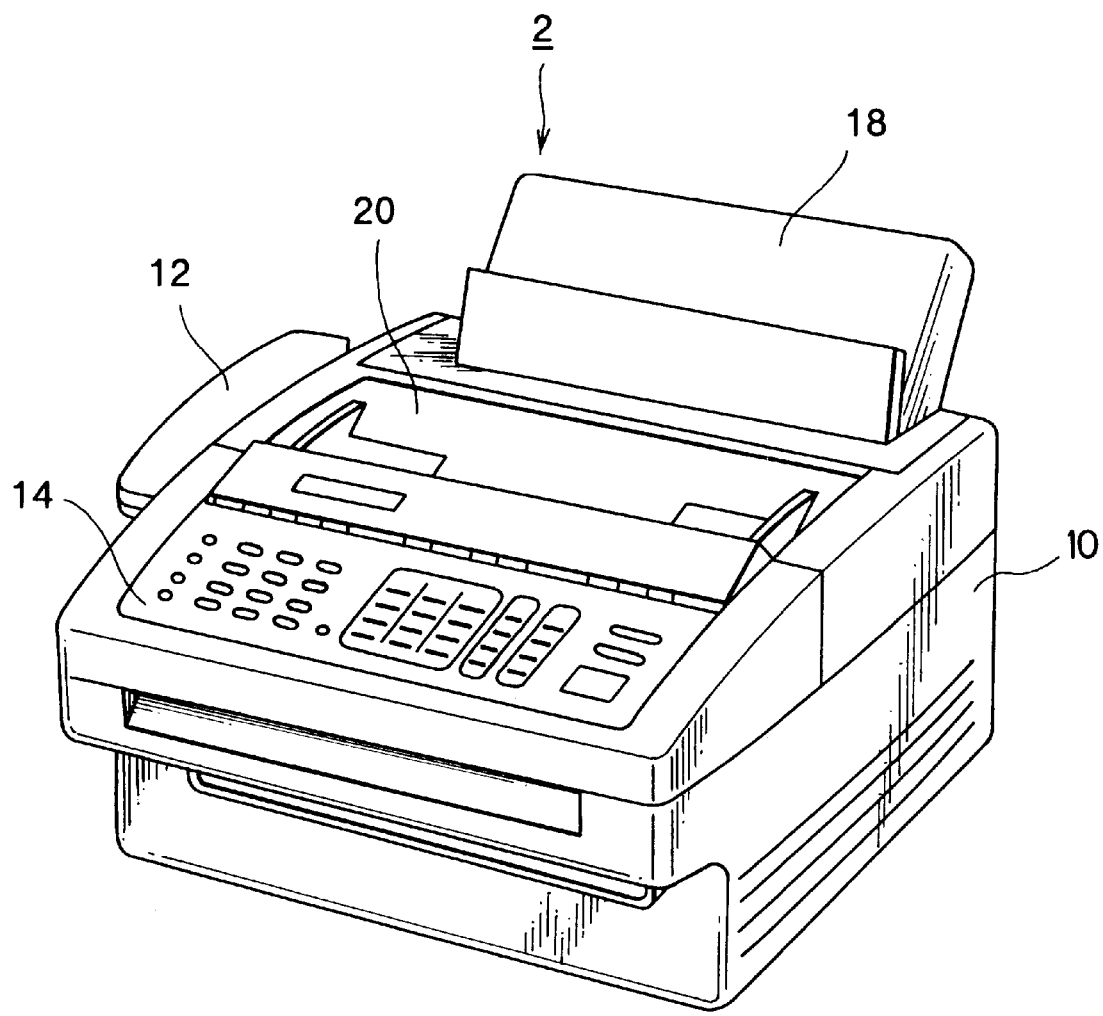
FIG. 2 is a perspective view showing an external view of a facsimile device according to an embodiment of the present invention.
Figure 3:
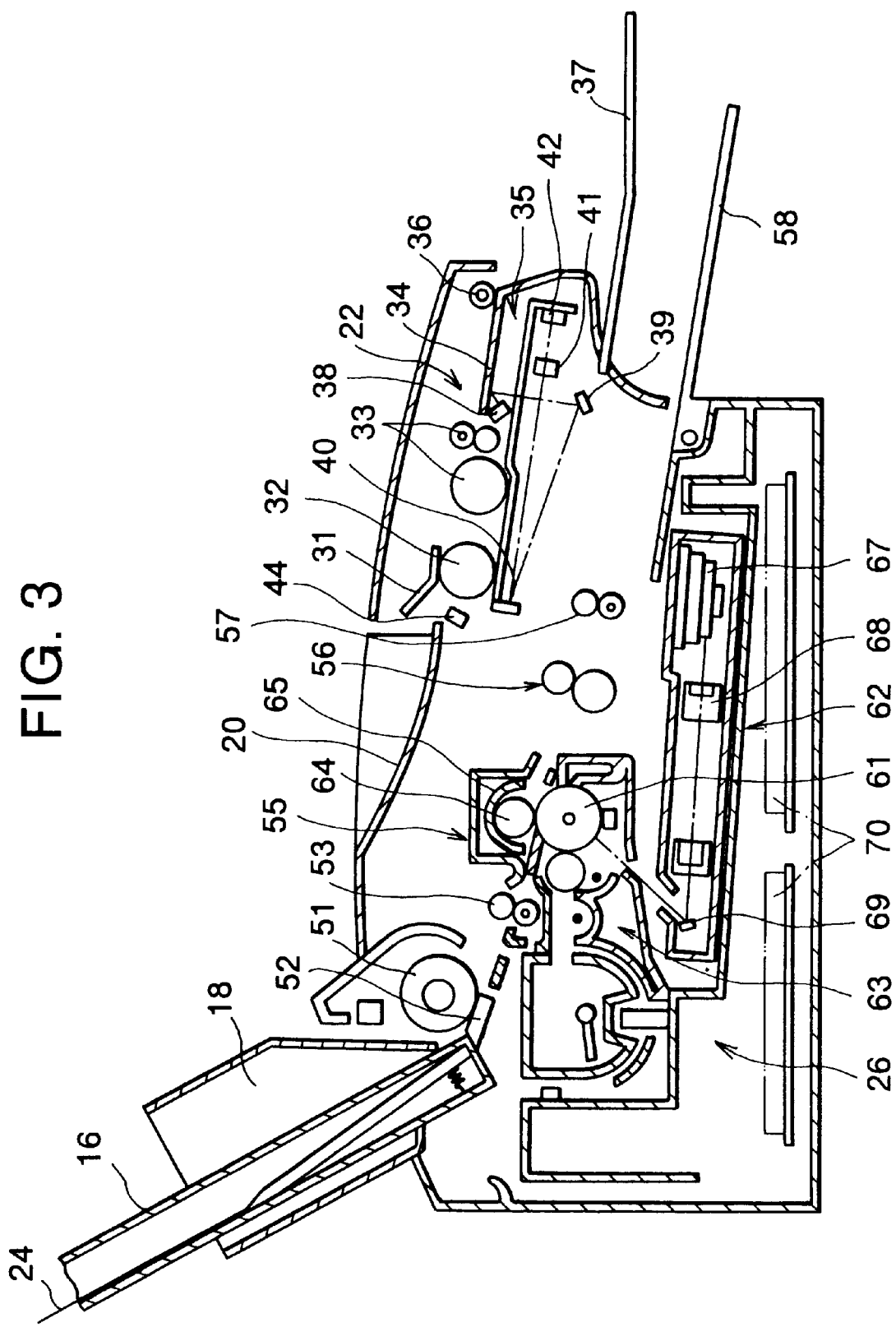
FIG. 3 is a cross-sectional view showing an interior structure of a facsimile device according to an embodiment of the present invention.

FIG. 2 is a perspective view showing an exterior view of a facsimile device 2 according to an embodiment of the present invention. FIG. 3 is a cross-sectional view showing an interior structure of the facsimile device 2.

The facsimile device 2 has a facsimile function and a printer function. The facsimile function is provided to general facsimile devices 2. The facsimile function includes reading an image from an original sheet and transmitting the image data as fax data to another facsimile device via a telephone line, and receiving fax data transmitted from another facsimile device via a telephone line and reproducing the image on a recording paper. The printer function includes receiving code data (PC data) transmitted via a printer cable from a personal computer (PC), word processor or other device and then printing an image on the recording paper according to the PC data.

As shown in FIG. 2, the facsimile device 2 has a main body 10, on a side portion of which is mounted a telephone receiver 12. An operation panel 14 is provided on a top surface of a front portion of the main body 10. A cassette tray insertion portion 18 is formed on a top surface of a rear portion of the main body 10 for inserting a paper cassette tray 16 (refer to FIG. 3). A sheet holder 20 is formed on a top surface of a central portion of the main body 10. A stack of original documents which contain information to be transmitted are placed in the sheet holder 20.

On the other hand, as shown in FIG. 3, a scanner portion 22, recording portion 26, and a control section 70 are incorporated in the main body 10. The scanner portion 22 reads an image from a document placed in the sheet holder 20. The recording portion 26 forms an image on a recording paper 24 contained in the paper cassette tray 16. The control section 70 carries out driving control of each of the scanner portion 22 and the recording portion 26 to thereby execute the facsimile and printer functions.

Original documents placed in the sheet holder 20 are taken into the scanner portion 22 one sheet at a time by means of a feed mechanism formed from a feed roller 32, a separation pad 31, and other components. Next, the original document is transported by transport rollers 33 to a sheet support plate 34 where the image side of the original document is placed face down. The image of the original document is then read by an image reading device 35 located below the sheet support plate 34. After the image has been read, the document is discharged by a discharge roller 36 to a discharge tray 37 provided on a front surface of the main body 10.

The image reading device 35 illuminates the image side of the original document placed on the sheet support plate 34 by a light source 38. Reflected light from the original document is reflected by mirrors 39, 40 and then gathered on a light receiving surface of a line image sensor 42 by a lens 41. In this way, the well-known process of reading line by line an image on an original document is carried out. A sheet sensor 44 is provided in the vicinity of the tip end of the sheet holder 20 for optically detecting presence of the sheet in the sheet holder 20.

The uppermost recording paper 24 stacked in the paper cassette tray 16 is taken into the recording portion 26 by a feed mechanism formed from a feed roller 51, a separation pad 52, and other components. Next, the recording paper 24 is sent to an image forming device 55 by a transport roller 53 where a toner image is formed on the recording paper 24. After the image is formed, the recording paper 24 is sent to a fixing device 56 where the toner image is thermally fixed. Thereafter, the recording paper 24 is discharged by a discharge roller 57 to a discharge tray 58 provided on a front surface of the main body 10. The fixing device 56 is a well-known unit formed from a heating roller and a pressure roller, the heating roller incorporating a heating device. The recording paper 24 is nipped between the pressure roller and the heating roller. The toner image on the recording paper 24 is fixed by heating and applying pressure to the recording paper 24.

The image forming device 55 includes a photosensitive drum 61, a laser scanner 62, a developing device 63 and a transferring device 65 with a transfer roller 64. The laser scanner 62 applies a laser beam to the photosensitive drum 61 to form an electrostatic image on the surface of the photosensitive drum 61. The developing device 63 adheres toner to the photosensitive drum 61 after the electrostatic image is formed thereon. The transferring device 65 has a transfer roller 64 and imparts electric charges to the recording paper 24 so that the toner adhered to the photosensitive drum 61 is transferred to the recording paper 24. The laser scanner 62 includes a laser source 67, a lens 68 for collecting the laser beams emitted from the laser source 67, and a reflecting mirror 69. The laser source 67 emits laser beams according to commands from the control section 70. The reflecting mirror 69 orients the laser beams toward the photosensitive drum 61. As described above, the recording portion 26 is configured as a laser printer and forms an image on the recording paper 24 according to commands from the control section 70.

Figure 4:
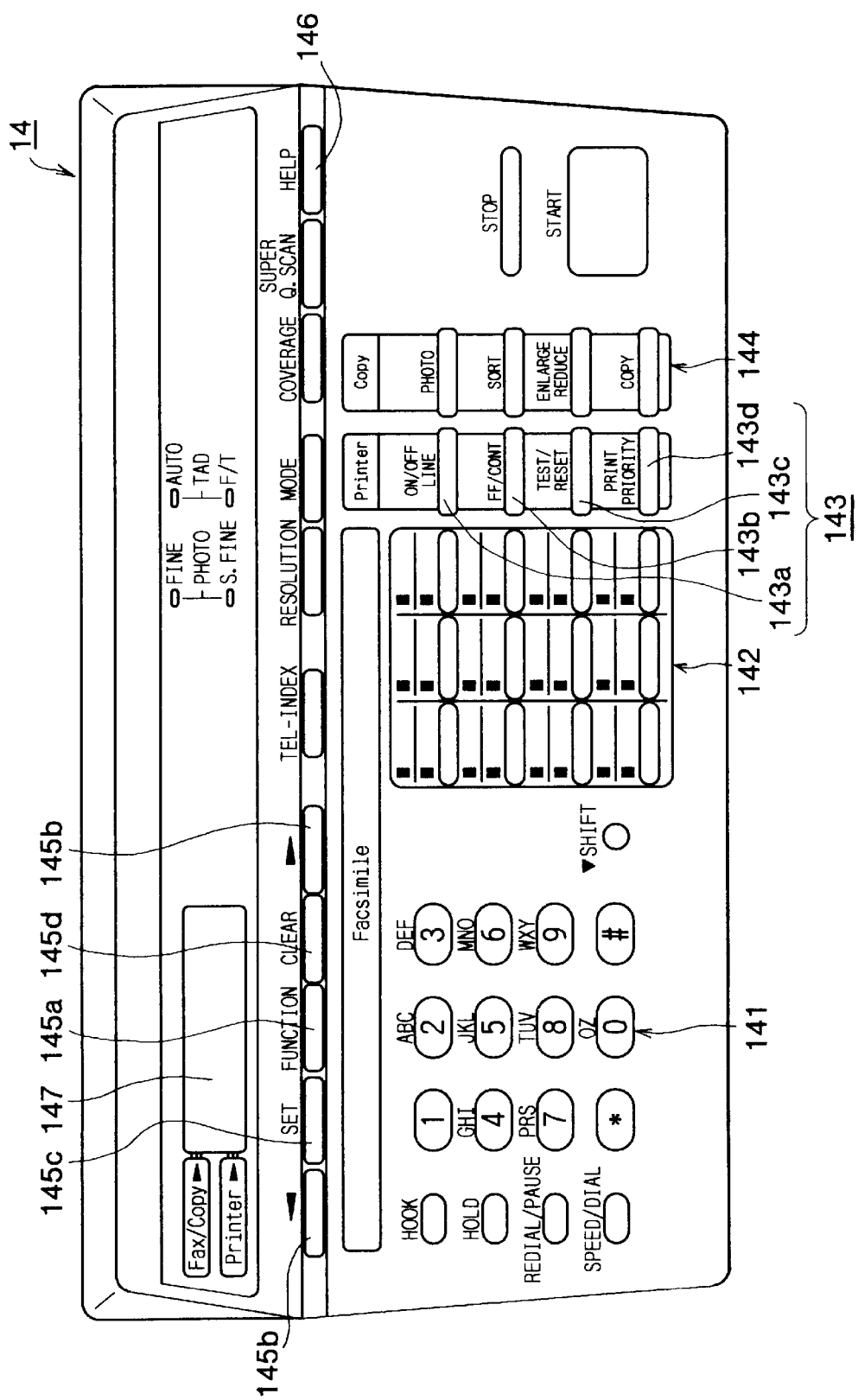
FIG. 4 is a plan view showing an operation panel configuration of a facsimile device according to an embodiment of the present invention.

The operation panel 14 is configured as shown in FIG. 4. As shown, the operation panel 14 is provided with various keyswitches including numeral keys 141, fax keys 142, printer keys 143, copy keys 144, a function key 145a, cursor keys 145b, a set key 145c, a clear key 145d and a help key 146. The operation panel 14 is also provided with a liquid crystal display 147. The numeral keys 141 are primarily used to input the fax number to be dialed. The fax keys 142 are used to give various instructions relating to the facsimile function. The printer keys 143 are used to give various instructions relating to the printer function. Specifically, the printer keys 143 consist of ON/OFF LINE key 143a, FF/CONT key 143b, TEST/RESET key 143c, and PRINT PRIORITY key 143d. The ON/OFF LINE key 143a is for switching between on-line and off-line. FF/CONT key 143b is for urging abolishment of residual PC data or instructing to re-print the final page. TEST/RESET key 143c is for instructing printing of sample data or reset of printer function. The PRINT PRIORITY key 143d (hereinafter referred to as "PP key 143d") is for instructing setting of a printer priority mode (hereinafter referred to as "PC priority mode") which will be described later in detail. The copy keys 144 are used to give various instructions relating to the copier function which is a part of the facsimile function. The function key 145a is used for making various settings relating to the various kinds of functions. The help key 146 is used to designate output of a help list. The liquid crystal display 147 displays the information relating to the various functions described above. In addition, the liquid crystal display 147 is made up of two levels, an upper level and a lower level, so that different information can be displayed on each level.

Figure 1:
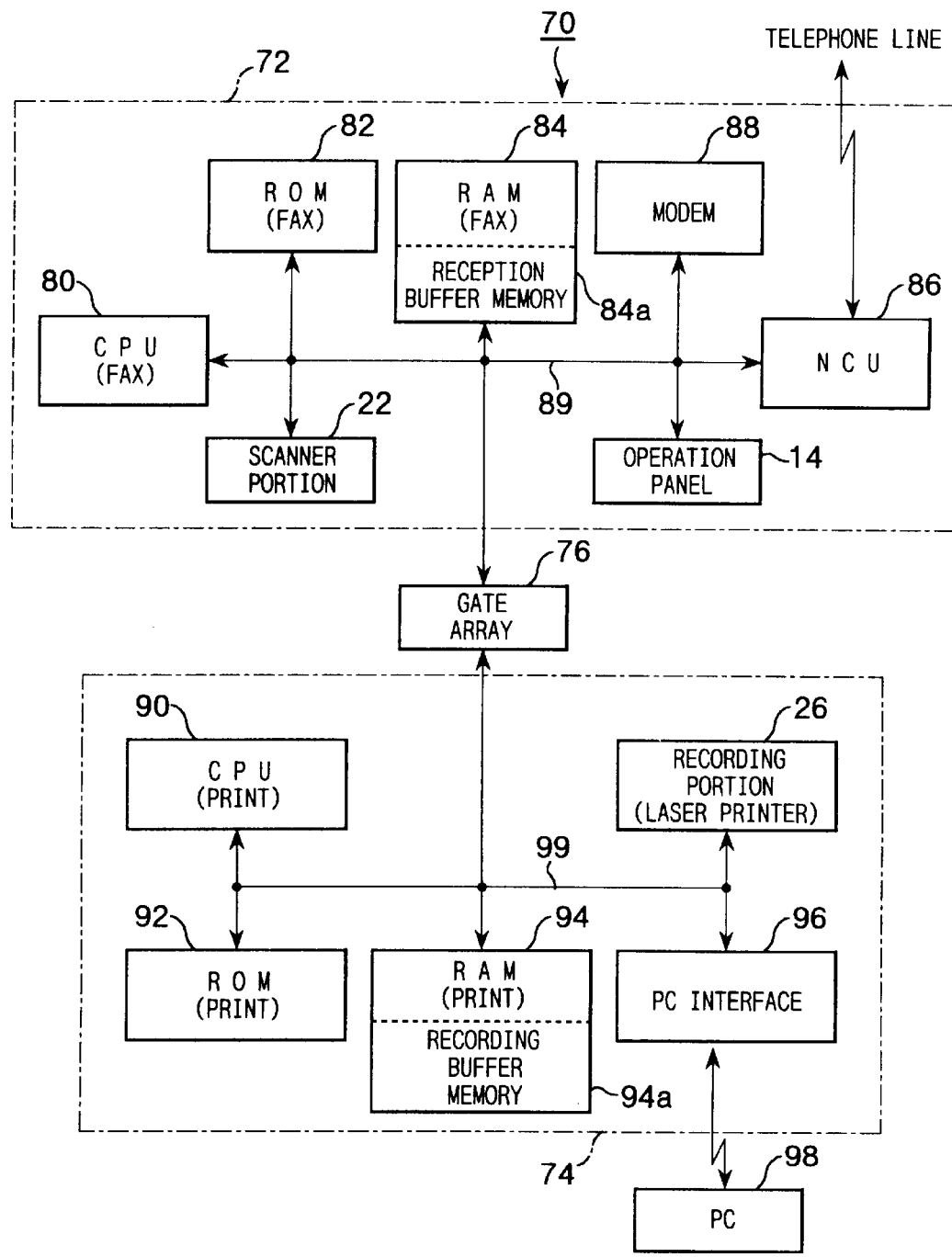
FIG. 1 is a block diagram showing a circuit configuration of a facsimile device according to an embodiment of the present invention.

Next, as shown in FIG. 1, the control section 70 which controls the various parts described above includes a facsimile (fax) portion 72, a printer portion 74, and a gate array 76 connecting these portions to each other.

According to the various commands from an operator which are inputted via the operation panel 14, the fax portion 72 carries out setting of the operation mode, reading of the sheet image, the transmission and reception of fax data, decoding of received data, and transfer of decoded fax data to the printer portion 74. The fax portion 72 includes a CPU 80, ROM 82, RAM 84, a network control unit (NCU) 86, a modem 88, and other components. The NCU 86 allows the possibility of voice communication and the transmission and reception of fax data between another telephone or facsimile device. The modem 88 is used to transmit and receive fax data between another facsimile device via the NCU 86. The CPU 80, ROM 82, RAM 84, NCU 86, modem 88 and the operation panel 14 are mutually connected to one another by a bus 89. The gate array 76 is also connected to the bus 89. The telephone receiver 12, a speaker and other components are connected to the NCU 86 so that voice communication with another telephone can be carried out via the telephone receiver 12.

On the other hand, the printer portion 74 is used to form or print a facsimile image on a recording paper 24 by executing driving control of the recording portion 26 according to the fax data sent from the fax portion 72 via the gate array 76. Like the fax portion 72, the printer portion 74 is configured as a microcomputer having a CPU 90, ROM 92 and RAM 94 as main components. Further, a PC interface 96 for receiving print code data is provided in the printer portion 74. When PC data is inputted to the PC interface 96 from an external personal computer (PC) 98, the CPU 90 executes driving control of the recording portion 26 according to the PC data and forms or prints on the recording paper 24 an image produced at the PC 98 side. The CPU 90, ROM 92, RAM 94, PC interface 96, and the recording portion 26 are mutually connected to one another by a bus 99. The gate array 76 is also connected to the bus 99.

Among the various control processes executed in the fax portion 72 and the printer portion 74, the main processes involved in the present invention are a printer operation setting process, a fax data reception process, and a printing process of fax data and PC data. These main processes will be described while referring to the flowcharts shown in FIGS. 5 to 13.

Figure 5:
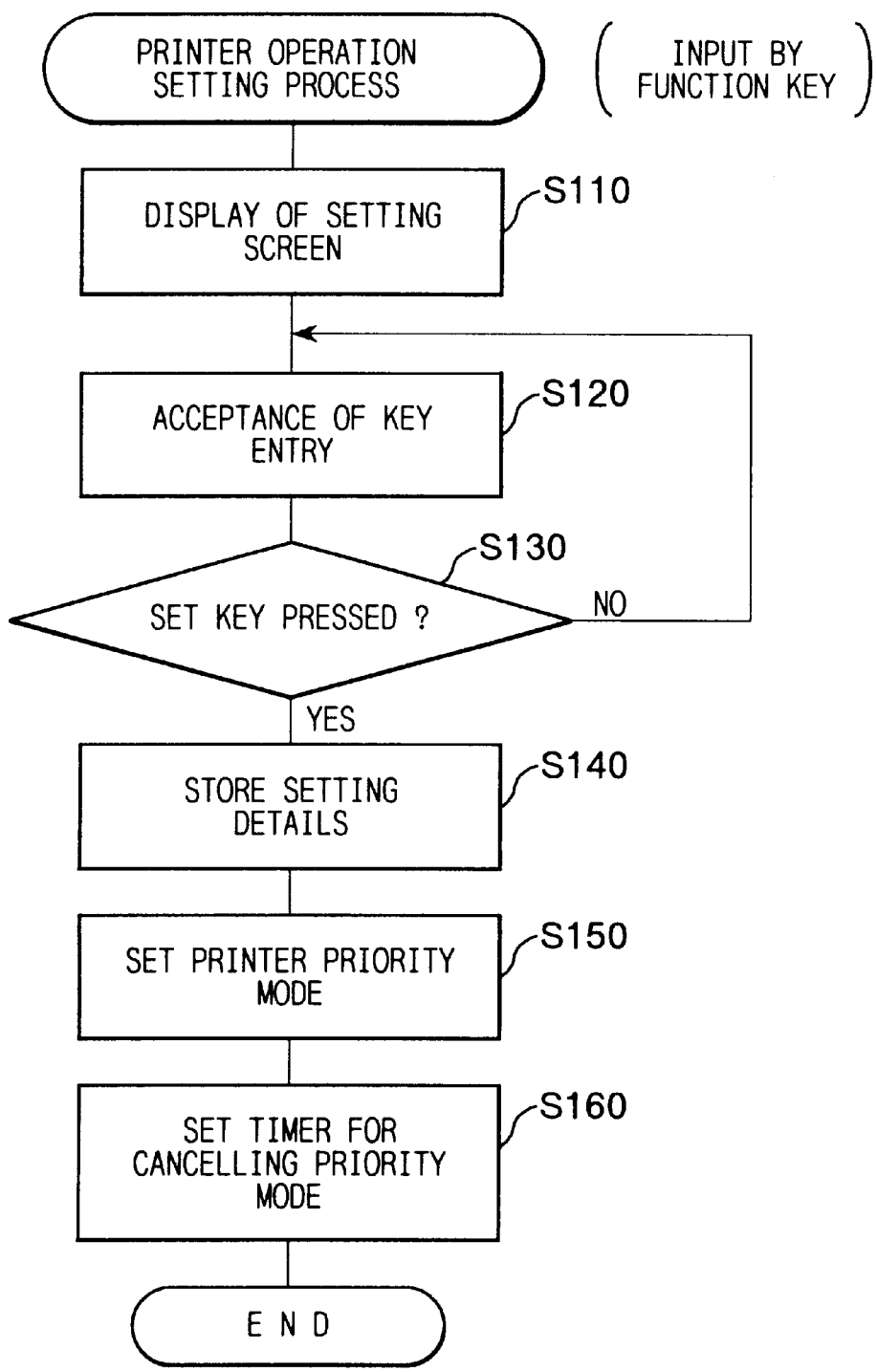
FIG. 5 is a flowchart showing a printer operation setting process.
Figure 6:
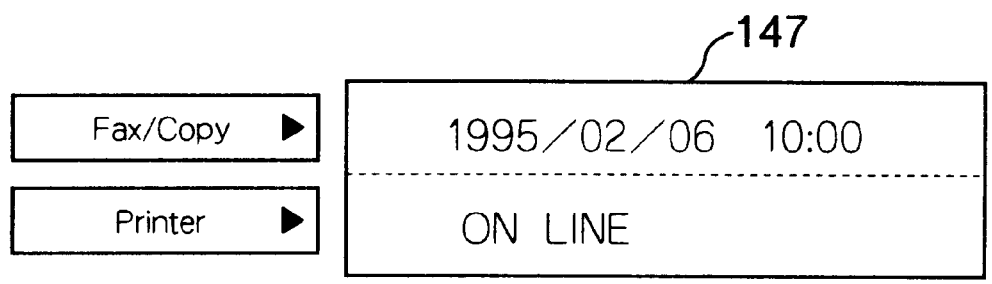
FIG. 6(A) is a diagram showing an example of a display before and after the printer operation setting process.
FIG. 6(B) is a diagram showing an example of a display when printer priority is set.
Figure 6:
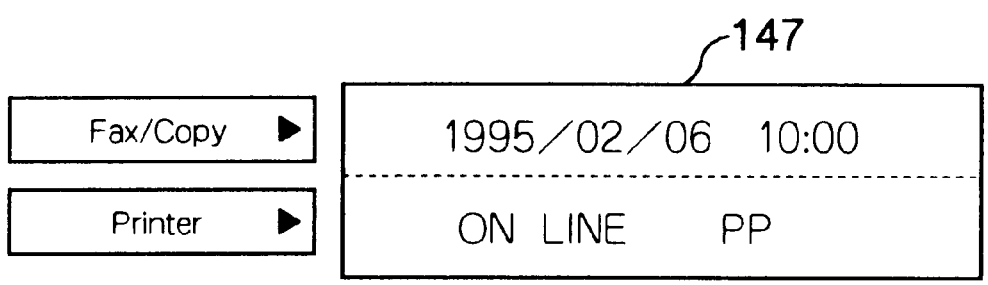

FIG. 5 is a flowchart showing a printer operation setting process for setting the control mode of the recording portion 26 provided at the printer portion 74 when printing PC data.

This process is executed at the FAX CPU 80 when an operator manipulates the function key 145*a* of the operation panel 14 to input the printer operation setting commands.

First, as shown in FIG. 5, when the process is started, in S110 ("S" indicates "Step") a setting screen is displayed showing setting items settable in the control mode and the currently set details.

The setting screen allows selection of the following: the size of the recording paper 24, the feeding method of the recording paper 24, the printing direction of the PC data on the recording paper 24, and the image resolution when printing the PC data. For each of these items, an operator is allowed to select from among the preset options. In the present embodiment, each of the setting items and selectable options for each item are displayed on the liquid crystal display 147 on the operation panel 14. The currently selected option of each setting item is highlighted. (1) Paper size: (a) Letter (8½×11 inch), (b) Legal (8½×14 inch), (c) A4 (210× 297 mm); (2) Paper feeding method: (a) Automatic feed, (b) Manual feed; (3) Printing direction: (a) Vertical, (b) Horizontal; (4) Resolution: (a) 300 dpi, (b) 170 dpi, (c) 75 dpi In this way, when the setting screen is displayed in S110, the operator manipulates the cursor keys 145*b* to designate options from among each of the setting items. Then, if the setting details are in order, the operator presses the set key 145*c* to set the selected options. Thus, in S120, the FAX CPU 80 accepts a key entry by the operator. If the key entry changes a selected option, then the FAX CPU 80 changes the highlighted option on the display screen accordingly and executes a key entry acceptance process. In S130, the FAX CPU 80 determines whether the set key 145*c* has been pressed or not. If it is determined that the set key 145*c* has not been pressed, then the process goes to S120 again. If it is determined that the set key 145*c* has been pressed, then in S140 the setting details on the display screen are stored in the RAM 84. Next, in S150, printer priority mode (hereinafter referred to as "PC priority mode") is set and stored in the RAM 84. Then, in S160, a timer for canceling PC priority mode is set whereupon the printer operation setting process is terminated.

The FAX CPU 80 changes the liquid crystal display 147 before and after the setting of PC priority mode in the following way. Before PC priority mode has been set, the upper level of the liquid crystal display 147 displays the current date and time as the information pertaining to the facsimile function as shown in FIG. 6(A). Also, the lower level of the liquid crystal display 147 displays "ON LINE" indicating that PC data is able to be received or "OFF LINE" indicating that PC data is unable to be received. The information indicated in the lower level of the liquid crystal display 147 pertains to the printer function. If PC priority mode is set, then a "PP" indicating print priority mode is displayed next to "ON LINE" (or "OFF LINE") in the lower level. This is shown in the example in FIG. 6(B). The indication of "PP" is an abbreviation of "Printer Priority".

The timer for canceling PC priority mode is set in S160 for automatically canceling PC priority mode set in S150 after a predetermined period of time (for example, 10 minutes) has elapsed. In the present embodiment, when the timer indicates that the predetermined period of time has expired, an interrupt process (not shown) is executed and PC priority mode is canceled. Then, with the cancellation of PC priority mode, the FAX CPU 80 returns the liquid crystal display 147 to the status of FIG. 6(A), for example. When the cancellation of PC priority mode has been done or when the PP key 143*d* is depressed, the PC priority mode on/off setting and the setting details stored in the RAM 84 are transferred to the PRINT CPU 90 on the printer portion 74 and stored in the RAM 94 of the printer portion 74 so that the information stored therein can be used at the CPU 90 when executing the printing process of fax data and PC data.

Next, a fax data reception process repeatedly executed as a main routine in the FAX CPU 80 will be described while referring to the flowchart shown in FIG. 7.

Figure 7:
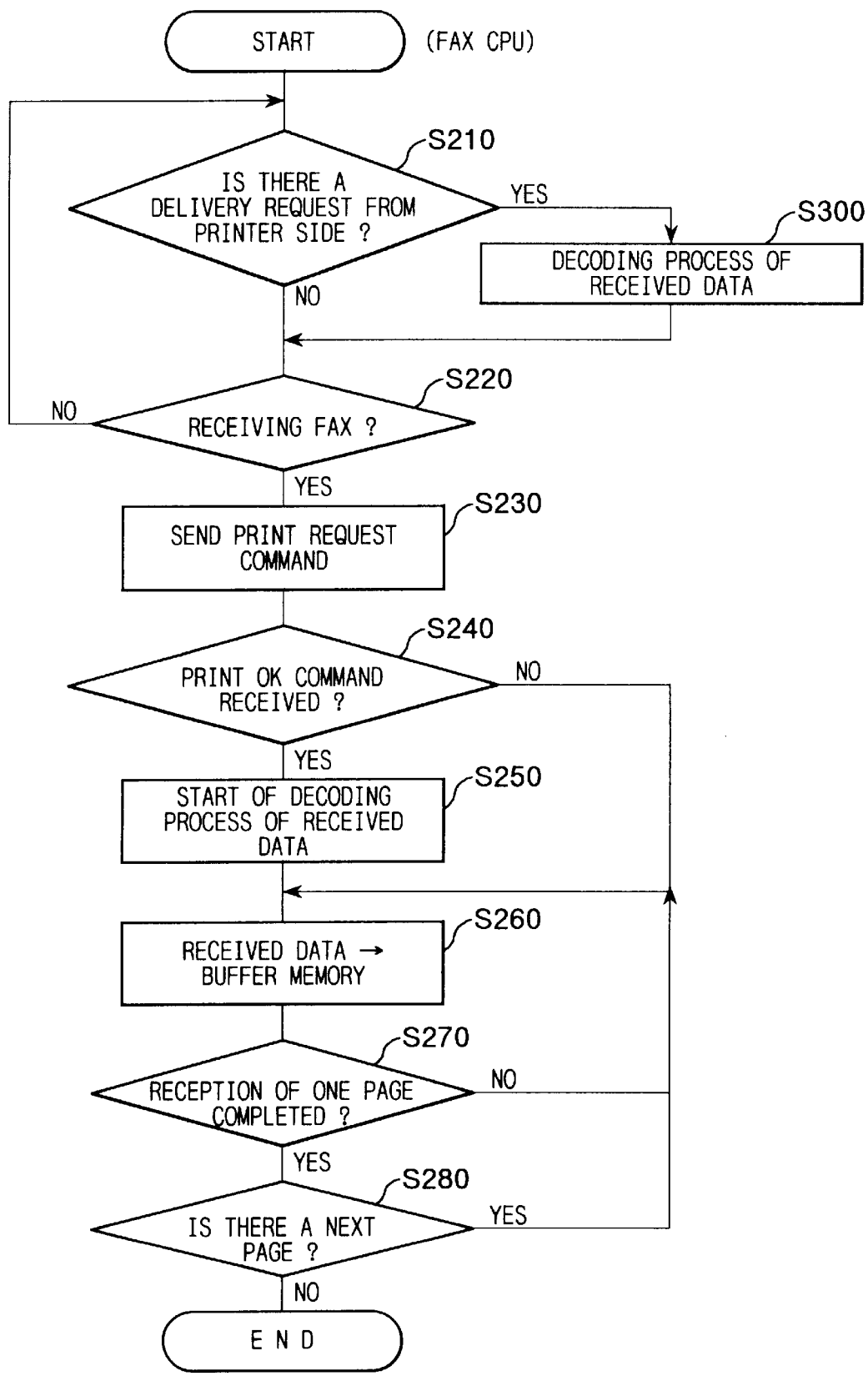
FIG. 7 is a flowchart showing a reception process of fax data.

First, as shown in FIG. 7, when the process is started, in S210 it is determined whether a received data delivery request has been sent from the printer portion 74. If there is a delivery request (S210: YES), then in S300 a decoding process of received data, which will be described later, is executed, and thereafter the process goes to S220. If there is no delivery request (S210: NO), then the process goes straight to S220. Then, in S220 it is determined whether fax data is being received by the NCU 86 and the modem 88. If fax data is being received (S220: YES), then the process goes to S230. If fax data is not being received (S220: NO), then the process goes to S210 again.

In S230, a PRINT REQUEST command is sent to the printer portion 74. In S240, it is determined whether a PRINT OK command has been received from the printer portion 74 in response to the PRINT REQUEST command. If the PRINT OK command has been received (S240: YES), then in S250 a decoding process of received data, which will be described later, is started, and thereafter the process goes to S260. If the PRINT OK command has not been received therefrom (S240: NO), meaning that the printer portion 74 is busy and thus the received data cannot be printed, then the process goes straight to S260.

In S260, the fax data received at the NCU 86 and the modem 88 is stored in a predetermined storage region (reception buffer memory 84*a*) in the RAM 84. In S270, it is determined whether the reception of a single page of fax data has been completed. If the reception of a single page of fax data is not completed (S270: NO), then the process goes to S260. Through this procedure, a single page of fax data is stored in the reception buffer memory 84*a*.

In S270, if it is determined that the reception of a single page of fax data has been completed (S270: YES), then in S280 it is determined whether a next page of fax data is being received at the NCU 86 and the modem 88. If a next page of fax data is not being received (S280: NO), then the process ends at that point. If a next page of fax data is being received, then the process goes to S260 again. The fax data for following pages is also received with the same procedure described above and is stored in the reception buffer memory 84*a*.

Next, the decoding process of received data executed in S300 and started in S250 will be described while referring to the flowchart shown in FIG. 8. This process is for sending the fax data stored in the reception buffer memory 84*a* to the printer portion 74. When the process is started in S250, execution of the decoding process is performed by way of time sharing using free time of the above-described reception process.

Figure 8:
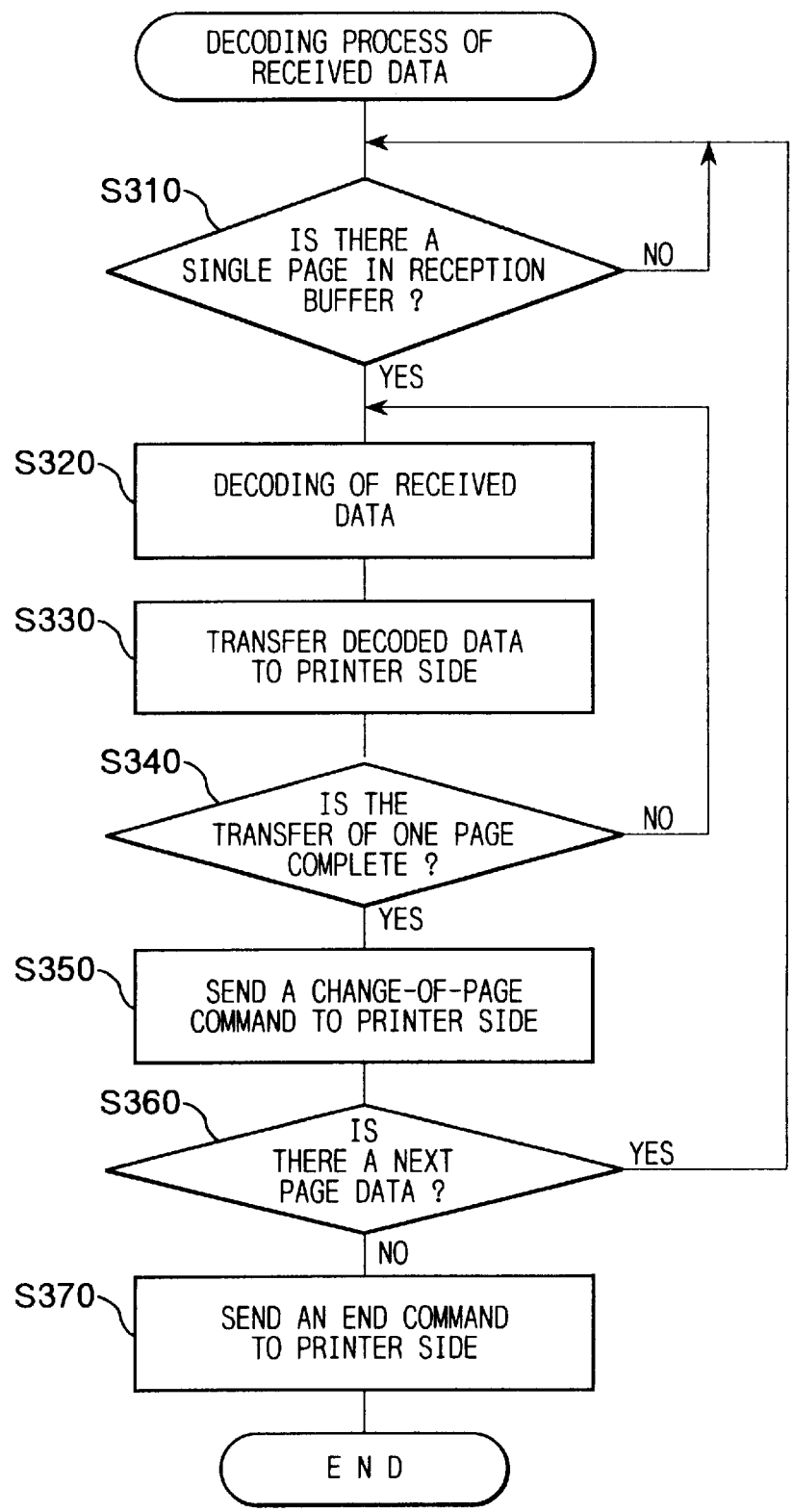
FIG. 8 is a flowchart showing a decoding process of received data.

As shown in FIG. 8, in the decoding process of received data, in S310 it is determined whether a single page of received data is stored in the reception buffer memory 84*a*. If a single page of received data is stored (S310: YES), then the process goes to S320. If a single page of received data is not stored (S310: NO), then the process waits until a single page of received data is stored in the reception buffer memory 84*a* by repeating the S310 process. When the decoding process of received data is started in S250 of the FIG. 7 flowchart, the S310 process waits for a single page of received data to be stored in the reception buffer memory 84a at S260 and subsequent steps of the process.

Next, in S320 the fax data stored in the reception buffer memory 84a is decoded into print code data (bitmap data) at a predetermined resolution (for example, 200 dpi). In S330, the decoded fax data is transferred to the printer portion 74. Then, in S340 it is determined whether the transfer of a single page of data is completed. If the transfer of a single page is not completed (S340: NO), then process goes to S320 again. In this way, the decoding and transfer of a single page of fax data is carried out.

On the other hand, if the decoding and transfer of a single page of fax data is completed (S340: YES), then in S350 a CHANGE-OF-PAGE command is sent to the printer portion 74, thereby informing the printer portion 74 that the sending of a single page of fax data is completed. Next, in S360 it is determined whether a next page of fax data to be printed remains in the reception buffer memory 84a. If a next page of fax data remains (S360: YES), then the process goes to S310 again. The following pages of fax data are also decoded and sent by means of the same procedure described above. If the decoding and sending of all the fax data stored in the reception buffer memory 84a is completed (S360: NO), then this is indicated in S370 by sending an END command to the printer portion 74, thereby ending the decoding process of received data.

Figure 9:
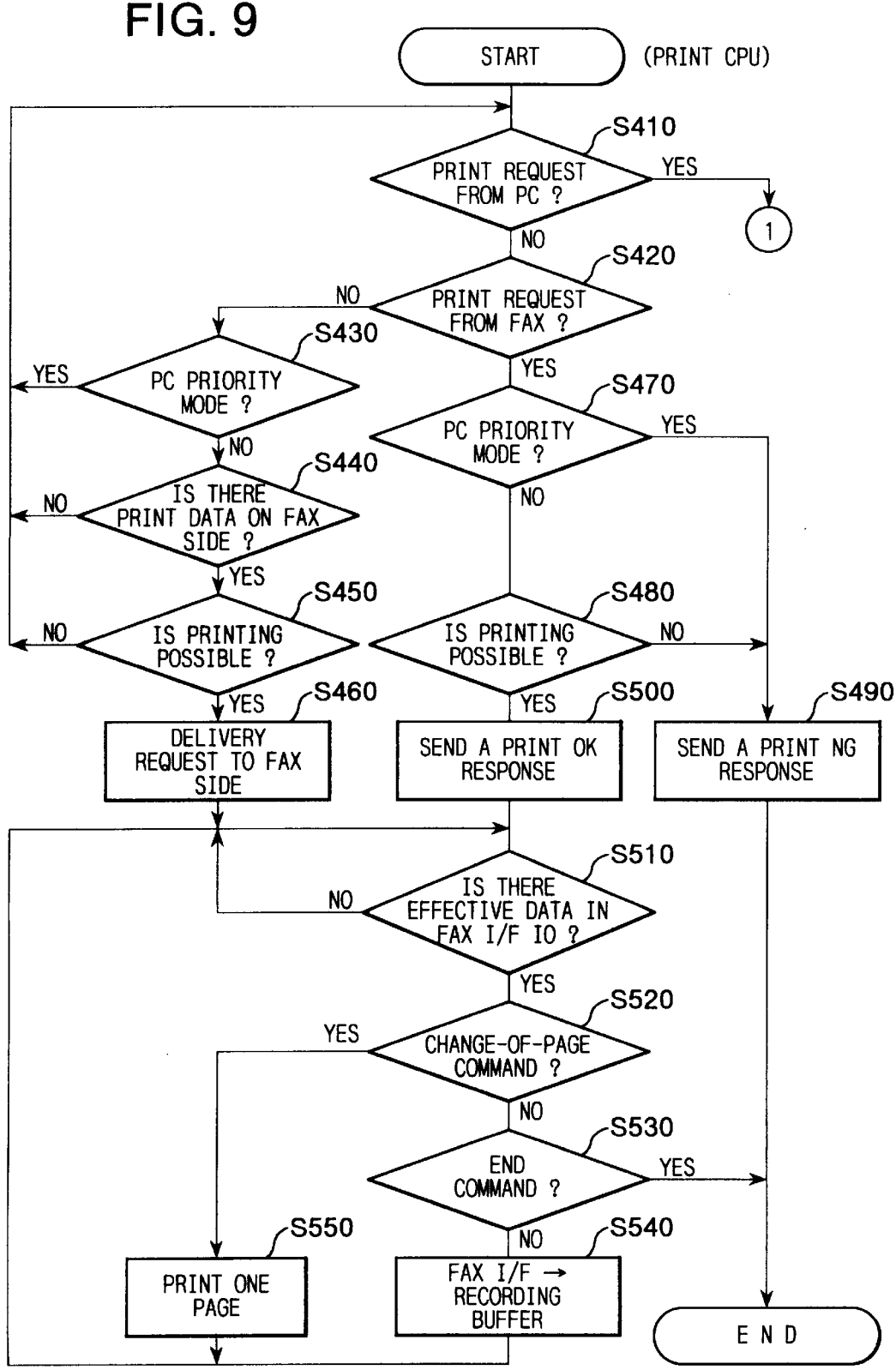
FIG. 9 is flowchart showing a portion of a data printing process.
Figure 10:
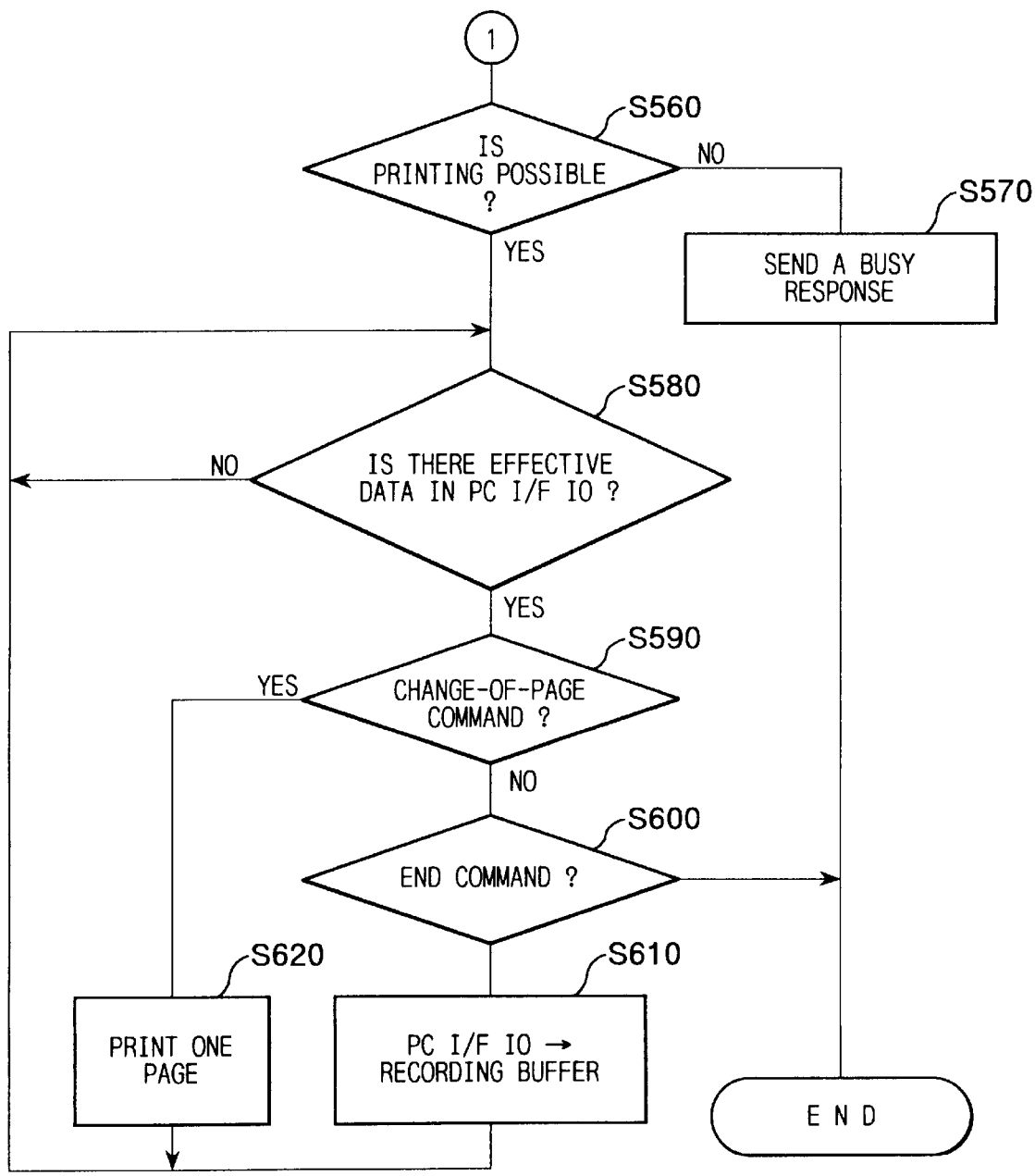
FIG. 10 is a flowchart showing the remaining portion of a data printing process.
Figure 11:
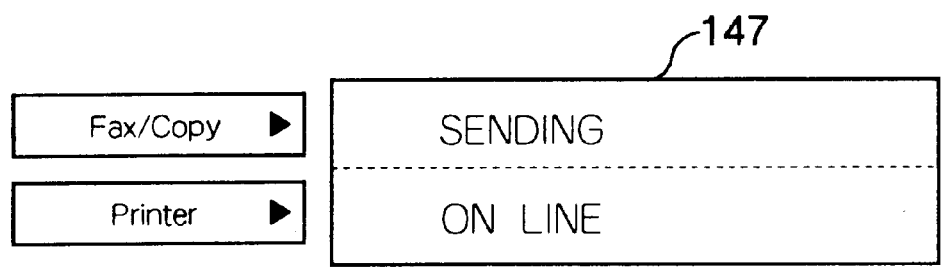
FIG. 11(A) is a diagram showing an example of a display during facsimile transmission.
FIG. 11(B) is a diagram showing an example of a display when operation priority is set to a printer section.
Figure 11:
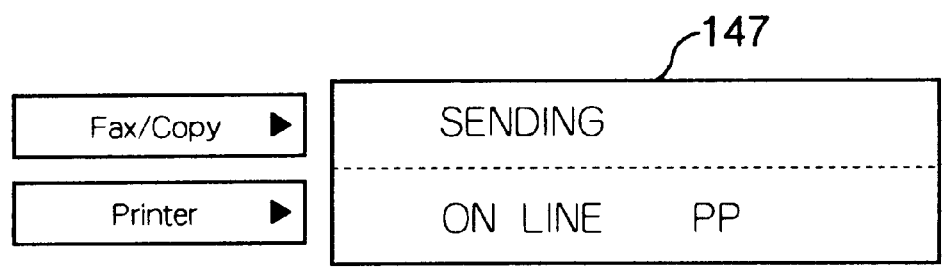

Next, a printing process of fax data and PC data executed by the PRINT CPU 90 is described while referring to the flowcharts shown in FIGS. 9 and 10.

First, as shown in FIG. 9, when this process starts, in S410 it is determined whether there is a print request from the PC 98 side. If there is a print request from the PC 98 side (S410: YES), then the process goes to the PC data printing process shown in FIG. 10. On the other hand, if there is no print request from the PC 98 side (S410: NO), then in S420 it is determined whether there is a print request from the fax portion 72.

If there is no print request from the fax portion 72 (S420: NO), then the process moves to S430 where it is determined whether PC priority mode is currently set or not. If PC priority mode is currently not set (S430: NO), then in S440 it is determined whether there is fax data to be printed in the fax portion 72 by asking the fax portion 72 if there is fax data to be printed stored in the reception buffer memory 84a. Next, if there is fax data to be printed in the fax portion 72 (S440: YES), then in S450 it is determined whether the recording portion 26 is capable of print operation. If print operation is possible (S450: YES), then in S460 a delivery request is sent to the fax portion 72, and the process moves to S510. The process goes back to S410 again in the following cases: in S430, if it is determined that PC priority mode is currently set (S430: YES); in S440, if it is determined that there is no fax data to be printed in the fax portion 72 (S440: NO); or in S450, if it is determined that the recording portion 26 is in a state where print operation is not possible (S450: NO).

On the other hand, in S420 if it is determined that there is a print request from the fax portion 72 (S420: YES), then in S470 it is determined whether PC priority mode is currently set. If PC priority mode is currently set (S470: YES), then in S490 a PRINT NG command is sent to the fax portion 72 indicating that currently the fax data cannot be printed. The process then ends at that point.

In S470, if it is determined that PC priority mode is not set (S470: NO), then the process moves to S480 where it is determined whether the recording portion 26 is capable of print operation. If the recording portion 26 is not capable of print operation (S480: NO), then in S490 a PRINT NG command is sent to the fax portion 72. The process then ends at that point. On the other hand, if the recording portion 26 is capable of print operation (S480: YES), then in S500 a PRINT OK command is sent to the fax portion 72. The process then goes to S510.

In S510, the PRINT CPU 90 determines whether there is effective data in the fax interface input/output port (hereinafter referred to as "FAX I/F IO") where data sent from the fax portion 72 is received via the gate array 76. Based on this, the PRINT CPU 90 waits for the fax data to be sent from the fax portion 72.

In S510, if it is determined that there is effective data in the FAX I/F IO (S510: YES), then in S520 it is determined whether the input data is a CHANGE-OF-PAGE command. If the input data is not a CHANGE-OF-PAGE command (S520: NO), then in S530 it is determined whether the input data is an END command. If the input data is not an END command (S530: NO), then in S540 the input data is stored in a recording buffer memory 94a in the PRINT RAM 94, and the process goes to S510 again. Through this procedure, the fax data sent from the fax portion 72 is successively stored in the recording buffer memory 94a of the RAM 94.

In S520, if the input data is determined to be a CHANGE-OF-PAGE command (S520: YES), this means that a single page of fax data for printing is stored in the recording buffer memory 94a of the RAM 94. Next, in S550 the recording portion 26 is driven according to the single page of fax data, forming or printing an image on the recording paper 24 corresponding to the fax data. The process then goes to S510 again. On the other hand, in S530 if it is determined that the input data is an END command (S530: YES), then there is no longer any fax data to be printed, and so the process ends at that point.

In S550, the fax data is transferred to the laser scanner 62. Laser beams are emitted from the laser scanner 62 corresponding to the data and, at the same time, the feed roller 51, transport roller 53, fixing device 56, discharge roller 57, photosensitive drum 61, developing device 63 and other components making up the recording portion 26 are each driven in synchronization. In this way, the fax data is printed.

On the other hand, in S410 if it is determined that there is a print request from the PC 98 side (S410: YES), then as shown in FIG. 10, in S560 it is determined whether the recording portion 26 is capable of print operation. If the recording portion 26 is not capable of print operation (S560: NO), then in S570 a BUSY signal is sent to the PC 98 side, whereupon the printing process is temporarily ended. Upon receipt of the BUSY signal, the FAX CPU 80 displays an error message "BUSY" in the lower level of the crystal liquid display 147.

However, if the recording portion 26 is capable of print operation (S560: YES), then in S580 the PRINT CPU 90 determines whether there is effective data in the PC interface input/output port (hereinafter referred to as "PC I/F IO") where data sent from the PC 98 is received via the PC interface 96. Based on this, the PRINT CPU 90 waits for the PC data to be sent from the PC 98.

In S580, if it is determined that there is effective data in the PC I/F IO (S580: YES), then in S590 it is determined whether the input data is a CHANGE-OF-PAGE command. If the input data is not a CHANGE-OF-PAGE command (S590: NO), then in S600 it is determined whether the input data is an END command. If the input data is not an END command (S600: NO), then in S610 the input data is stored successively in the recording buffer memory 94a in the PRINT RAM 94, and the process goes to S580 again. Through this procedure, the PC data sent from the PC 98 side is stored in the recording buffer memory 94a of the RAM 94.

To print the PC data on the recording paper 24 according to the setting details selected in the printer operation setting process, in S610 the storing of the PC data in the recording buffer memory 94a is not like S540 where the fax data is stored in the recording buffer memory 94a as it is. Instead, the PC data in code data form is expanded into bitmap data for printing using predetermined font data according to the print resolution, paper size, and printing direction set above. The data is then stored in the recording buffer memory 94a.

In S590, if the input data is determined to be a CHANGE-OF-PAGE command (S590: YES), then this means that a single page of PC data is stored in the recording buffer memory 94a of the RAM 94. Next, in S620 the recording portion 26 is driven according to the single page of PC data, forming or printing an image on the recording paper 24 (printing) corresponding to the PC data. The process then goes to S580 again. On the other hand, in S600 if it is determined that the input data is an END command (S600: YES), then there is no longer any PC data to be printed, and so the process ends at that point.

The printing of the PC data in S620 is basically executed in the same way as the printing of the fax data in S550. However, if manual feed is set as the paper feed method selected in the printer operation setting process, then the recording paper 24 can be fed manually.

A predetermined operation of the fax keys 142 makes the FAX CPU 80 execute a well-known transmission process of sending image data read at the scanner portion 22 via a telephone line. At this moment, the FAX CPU 80 displays a "SENDING" message in the upper level of the liquid crystal display 147 as shown in FIGS. 11(A) and 11(B) to indicate that transmission is in progress. If PC priority mode is not set, then an "ON LINE" or an "OFF LINE" message is displayed in the lower level; of the liquid crystal display 147. When the PC priority mode is set, "PP" indicating that the PC priority mode has been set is displayed next to the "ON LINE" or "OFF LINE" message as shown in FIG. 11(B). If any kind of fault occurs at the facsimile device 2, the FAX CPU 80 executes an error display process as an interrupt process to display an error message in either the upper or lower level of the liquid crystal display 147. Other than error messages, a variety of messages regarding the function and operation of the facsimile are displayed in the upper and lower level of the liquid crystal display 147. In all such cases, if the PC priority mode is set, the indication of "PP" is displayed next to the message displayed in the lower level of the liquid crystal display 147, which message pertains to the status, operation and function of the printer.

As described above, in a preferred embodiment, a PC priority mode is automatically set in S150 by setting a control mode of the recording portion 26 through manipulations of the operation panel 14. The thus set PC priority mode will not be canceled until expiration of the time set in the timer. After expiration of the time set in the timer, the PC priority mode will be automatically canceled. The PC priority mode can also be set by the depression of the PP key 143d and the subsequent depression of the same key will cancel the PC priority mode.

When fax data is received in the fax portion 72 under the PC priority mode and the fax portion 72 sends to the printer portion 74 a print request of the fax data (S230), the printer portion 74 will reject the print request (S420, S470, S490) but will accept the print request of the PC data delivered from the PC 98 side and print the PC data (S410, S560 through S620).

Accordingly, with the facsimile device of a preferred embodiment, setting the PC priority mode prevents fax data from interrupting printing of the PC data inputted from the PC 98.

Further, according to a preferred embodiment, information about the facsimile function is displayed by letters in the upper level of the liquid crystal display and information about the printer function is displayed also by letters in the lower level of the liquid crystal display, as shown in FIGS. 6(A), 6(B), 11(A) and 11(B). When the PC priority mode is set, an abbreviation "PP" of "Printer Priority" is displayed next to the message about the printer function. Therefore, from the indication in the liquid crystal display, the operator can recognize the fact that the PC priority mode has been set. Indication in the liquid crystal display of the PC priority mode will prevent erroneous operations, such as an operator depressing, despite the fact that the PC priority mode has been set, the PP key 143d with an intention to set the PC priority mode, which would result in cancellation of the PC priority mode contrary to the operator's intention to set the PC priority mode.

Still further, in a preferred embodiment, the fax portion 72 and the printer portion 74 are each controlled by separate CPUs 80, 90. As a result, the processing speed of the facsimile device 2 as a whole is improved, and the display process by the liquid crystal display 147 is made faster. Therefore, the above-described information and the indication of "PP" can be understood at a faster rate than if only one CPU was used.

The present invention is not limited to the embodiment described above, and it would be apparent to those skilled in the art that various changes and modifications may be made therein without departing from the spirit of the invention. For example, although the above-described embodiment is directed to a facsimile device which uses a laser printer in the recording portion 26, a thermal printer with a thermal head, any ink jet printer or other type of conventional printer can be used in the recording portion 26. Furthermore, in the above embodiment, the fax portion 72 and the printer portion 74 are provided with separate CPUs 80, 90. However, each of the portions 72, 74 may be controlled by a single CPU.

Although the above embodiment describes that a predetermined period of time has been set as a time duration for the PC priority mode, a desired time duration may be set by the operator when the printer operation setting process is executed. Furthermore, the operation priority may be given to the facsimile function rather than the printer function. It would be preferable in some cases to give a priority to the facsimile function in the case where a voluminous amount of PC data is to be printed. When the priority is awarded to the facsimile function, then the fax data can be immediately printed even when the fax data is received during printing of the PC data. Although, in such a case, printing of the PC data is interrupted by the fax data, printing of the PC data can be resumed immediately after printing of the fax data has been completed if the PC data which remains unprinted is stored in a buffer provided in conjunction with the PC 98. Moreover, the indication of the priority mode set to either the printer function or the facsimile function can be implemented by illuminating an LED.

What is claimed is:

1. A device having both a facsimile function and a printer function, comprising:
   a recording section having an input for receiving data to be recorded on a recording sheet;
   a memory;
   a facsimile section communicable with a remote facsimile device, said facsimile section receiving fax data from the remote facsimile device and applying the fax data to the input of said recording section to record the fax data on the recording sheet;
   a printer section connectable to an external device, said printer section receiving print data from the external device and applying the print data to the input of said recording section to record the print data on the recording sheet;
   priority mode setting means for setting a priority mode in which a recording priority is set to either one of said facsimile section and said printer section;
   a display unit which displays a priority set indication for indicating the priority mode when the recording priority has been set by said priority mode setting means; and
   a controller which selectively controls said recording section either in the priority mode or in a normal mode in which the priority mode is not set, wherein said controller controls, in the priority mode, said recording section so as to reject recording of the fax data or the print data from a section to which no recording priority is set, controls, in the normal mode, said recording section to either record the print data first or record the fax data first depending on which is applied earlier to said recording section, controls, in the priority mode, said memory to store the fax data or the print data from the section to which no recording priority is set, and controls said recording section to perform recording of the fax data or the print data stored in said memory when the priority mode is canceled.

2. A device according to claim 1, wherein said display unit has a display region separated into a first display region and a second display region, said display unit further displaying, in the first display region, first information about said facsimile section and, in the second display region, second information about said printer section, and wherein the priority set indication is displayed in a one of the first display region and the second display region corresponding to which section the recording priority mode is set.

3. A device according to claim 2, wherein the priority set indication is represented by at least one of a letter and a symbol.

4. A device according to claim 3, wherein each of the first information and the second information is made up of a plurality of messages pertaining to operations and statuses of said facsimile section and said printer section, and wherein said controller controls said display unit to display selected messages in the first display region and the second display region of said display unit.

5. A device according to claim 4, further comprising a sensing device which senses the operations and statuses of said facsimile section and said printer section, said sensing device outputting signals pertaining to sensed operations and statuses of said facsimile section and said printer section to said controller, and wherein said controller controls said display unit to display messages selected based on the signals outputted from said sensing device.

6. A device according to claim 1, further comprising priority mode canceling means for canceling the priority mode set by said priority mode setting means, and wherein said controller controls said recording section to perform recording in the normal mode when the priority mode is canceled by said priority mode canceling means.

7. A device according to claim 1, wherein said priority mode setting means comprises time duration setting means for setting a time duration during which the priority mode set by said priority mode setting means is effective, wherein said controller controls said recording section to perform recording in the normal mode when the time duration set by said time duration setting means has expired, and wherein said display unit has a display region separated into a first display region and a second display region, said display unit further displaying, in the first display region, first information about said facsimile section and, in the second display region, second information about said printer section, the priority set indication being displayed in a one of the first display region and the second display region corresponding to which section the recording priority mode is set.

8. A device having both a facsimile function and a printer function, comprising:
   a recording section having an input for receiving data to be recorded on a recording sheet;
   a facsimile section communicable with a remote facsimile device, said facsimile section receiving fax data from the remote facsimile device and applying the fax data to the input of said recording section to record the fax data on the recording sheet;
   a printer section connectable to an external device, said printer section receiving print data from the external device and applying the print data to the input of said recording section to record the print data on the recording sheet;
   priority mode setting means for setting a priority mode in which a recording priority is set to either one of said facsimile section and said printer section, said priority mode setting means comprising time duration setting means for setting a time duration during which the priority mode is effective;
   a display unit which displays a priority set indication for indicating the priority mode when the recording priority has been set by said priority mode setting means; and
   a controller which selectively controls said recording section either in the priority mode or in a normal mode in which the priority mode is not set, wherein said controller controls, in the priority mode, said recording section so as to reject recording of the fax data or the print data from a section to which no recording priority is set, and controls, in the normal mode, said recording section to either record the print data first or record the fax data first depending on which is applied earlier to said recording section.

9. A device having both a facsimile function and a printer function, comprising:
   a recording section having an input for receiving data to be recorded on a recording sheet;
   a facsimile section communicable with a remote facsimile device, said facsimile section receiving fax data from the remote facsimile device and applying the fax data to the input of said recording section to record the fax data on the recording sheet;
   a printer section connectable to an external device, said printer section receiving print data from the external device and applying the print data to the input of said recording section to record the print data on the recording sheet; and selection means to be enabled upon operator's manipulation for selecting one of the fax data and the print data, selected data being recorded by said recording section precedent to non-selected data.

10. A device according to claim 9, wherein said selection means comprises a switch manually operable by an operator for performing switching between a selection mode for selecting one of the fax data and the print data and a non-selection mode for disabling the selection mode.

11. A device according to claim 10, further comprising a display unit for displaying that said selection mode has been set by the operator.

12. A device according to claim 9, wherein said selection means comprises priority setting means for setting a priority to a predetermined one of the fax data and the print data, either the fax data or the print data to which the priority is set being recorded by said recording section precedent to no priority set data.

13. A device according to claim 12, further comprising canceling means for canceling the priority set by said priority setting means.

14. A device according to claim 13, wherein said canceling means comprises time duration measuring means for measuring a predetermined time duration, wherein the priority set by said priority setting means is canceled when the predetermined time duration has expired.

15. A device according to claim 14, further comprising a display unit which displays that the priority has been set by said priority setting means.

16. A device according to claim 15, wherein said display unit has a display region separated into a first display region and a second display region, said display unit displaying, in the first display region, first information about said facsimile section and, in the second display region, second information about said printer section, and wherein an indication of the priority set by said priority setting means is displayed in a one of the first display region and the second display region in relation to the priority setting.

17. A device having both a facsimile function and a printer function, comprising:

a recording section having an input for receiving data to be recorded on a recording sheet;

a memory;

a facsimile section communicable with a remote facsimile device, said facsimile section receiving fax data from the remote facsimile device and applying the fax data to the input of said recording section to record the fax data on the recording sheet;

a printer section connected to an external device, said printer section receiving print data from the external device and applying the print data to the input of said recording section to record the print data on the recording sheet;

operation setting means for setting a predetermined operation to be performed by selective one of said recording section, said facsimile section and said printer section, said operation setting means automatically setting a printer priority mode in which a recording priority is set to said printer section;

a display unit which displays the printer priority mode; and a controller which controls said recording section to perform recording of the print data and to reject recording of the fax data when the recording priority is set to said printer section, and to perform recording of the fax data received during the printer priority mode when the recording priority set to said printer section is canceled.

18. A device according to claim 17, wherein said controller controls said recording section so as to reject recording of the fax data.

19. A device according to claim 17, wherein said operation setting means comprises time duration setting means for setting a time duration during which the printer priority mode is effective.

20. A device according to claim 19, wherein the time duration set to said time duration setting means is variable when said operation setting means sets the operations of said printer section.

21. A device according to claim 20, wherein said controller controls, when the printer priority mode is canceled, said recording section to either record print data first or record fax data first depending on which is applied earlier to said recording section.

22. A device according to claim 8, wherein said controller controls said recording section in the normal mode when the time duration set by said time duration setting means has expired.

23. A device according to claim 8, further comprising priority mode canceling means for canceling the priority mode set by said priority mode setting means, and wherein said display unit turns off the priority set indication when the priority mode is canceled by said priority mode canceling means and after expiration of the time duration set by said time duration setting means.

24. A device according to claim 8, wherein said priority mode setting means sets the priority mode to said printer section.

* * * * *